March 2, 1943. C. A. DIES 2,312,885
SAFETYPIN
Filed Aug. 12, 1942
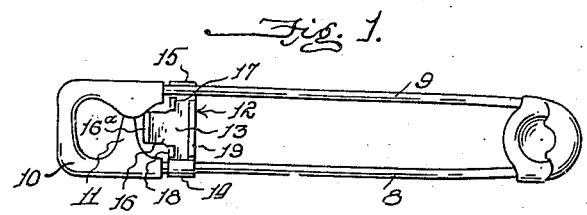
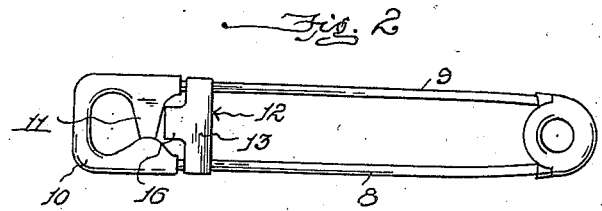
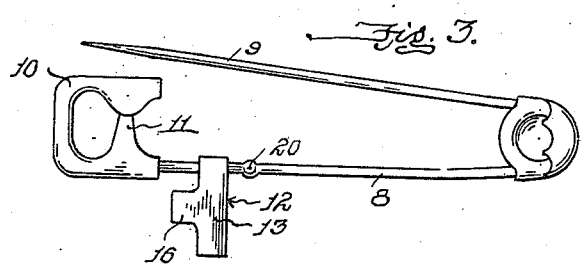
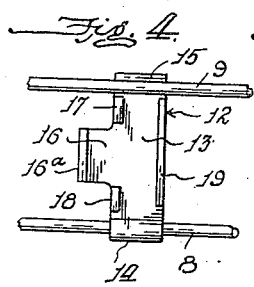 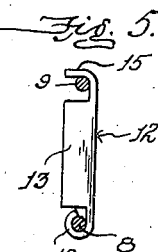 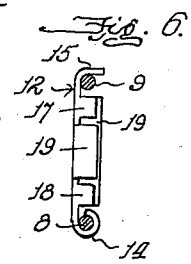 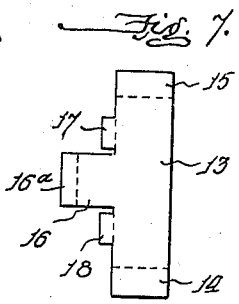
Inventor:-
Charles A. Dies.
By Horace D. Beall
Attorneys Patented Mar. 2, 1943

2,312,885

UNITED STATES PATENT OFFICE 2,312,885

SAFETY PIN

Charles A. Dies, Chicago, Ill.

Application August 12, 1942, Serial No. 454,610

5 Claims. (Cl. 24—161)

My invention relates to safety pins, and has particular reference to the provision of means for retaining the point of the pin in engagement with the head or guard when the safety pin is fastened to the garment.

In the use of the ordinary safety pin having a tongue for guiding the point into engagement with the head and retaining it therein the tongue is not always effective in holding the point within the head, and should the point become disengaged it not only defeats the object of holding the point in place but also exposes the same so that it is likely to prick the skin of the user, the latter objection being particularly distressing when the safety pin is used for fastening the garments of infants, prompting the provision of additional retaining means which, so far as I am advised, are cumbersome or otherwise objectionable.

The principal object of my invention therefore is to provide a simple and effective lock point safety pin in which the means for locking the point within the head or guard will serve to positively retain the pin in closed position when fastened to the garment—thereby increasing its reliability—and by the inclusion thereof in connection with an ordinary safety pin it will not add materially to the cost of production as a new article of manufacture.

A further object of my invention is to provide an ordinary type of safety pin with a point retaining means or keeper that can be easily and conveniently manipulated for the purpose of opening and closing the pin, and when in locked position will maintain the members thereof in spaced apart relation for firmly holding the point within the head or guard.

With these main features of construction and operation in view my invention consists primarily in the provision of a keeper comprising a small piece of sheet metal bent to provide a hinge-eye for connecting the keeper to the rear member of a conventional type of safety pin, and including a hook for locking engagement with the other or companion member of the pin, in association with projections for maintaining the locked engagement and for closing the open inner end of the head or guard—as hereinafter fully described and more specifically set forth in the appended claims.

In the drawing:

Figure 1 is a front elevation showing the locking means or keeper in operative position when the safety pin is closed.

Fig. 2 is a rear elevation thereof.

Fig. 3 is a front elevation showing the position of the locking device or keeper out of locking engagement and the garment fastening member of the pin out of engagement with the head.

Figs. 4, 5 and 6 are detail views of the locking device or keeper, and

Fig. 7 is a plan view of the blank from which the keeper is formed.

As shown in the drawing my invention, hereinafter described, is applied to a conventional type of safety pin in which a length of spring wire is bent or coiled upon itself to provide parallel members one of which, 8, may be termed the rear member and the other, 9, the front member—the spring coil having the usual shield and the rear member provided at its outer end with a head or sheet metal guard 10 with retaining lips between which the point of the front or garment fastening member is guided by the tongue 11. In carrying out my invention I retain the point of the safety pin within the head in a reliable and dependable manner by means of a locking device hingedly connected to and slidable on the rear member for locking engagement with the other or garment engaging member, the said locking device being adapted to not only close the inner end of the head to securely retain the point of the pin therein but also serves to firmly hold the garment engaging member in position in respect to the head of the safety pin.

The locking device or keeper—referred to generally by the numeral 12—is made of sheet metal shaped to form a rectangular body portion 13 bent upon itself at opposite ends to provide an eye 14 at one end and a hook 15 at the other end for interlocking engagement with the spaced apart members of the safety pin, and for retaining the point of the pin within the head. The body portion of the locking device is also provided with an inwardly projecting portion 16 the outer end of which is bent abruptly to form a short projection 16ᵃ adapted to close the inner end of the head or lips between which the point of the pin is held in closed position. To cooperate with the hook 15 the locking device is provided with an outwardly projecting member 17 at one side of the projecting portion 16 to form a lug to confine the garment fastening member 9 between it and the hook, with a similar lug 18 adjoining the hinge-eye for reinforcing the connection of the latter to the other or companion member of the safety pin. For protecting the material of the garment—to which the safety pin is fastened—from being cut or torn against the inner edge of the body portion 13, a longitudinal rib 19 is formed by bending the plank abruptly, and this also serves to stiffen the locking device, being augmented by the projections 16, 17 and 18, whereby the locking device will not become bent or distorted in the use of the safety pin.

The operation of the locking device or keeper will be readily understood by reference to the drawings, from which it will be noted that the safety pin is adapted to be used in fastening together articles of clothing. In use, the locking device, hinged to the rear member 8, is disengaged from the garment fastening member 9 and swung down to permit the safety pin to be opened as shown in Fig. 3. The member 9 is then free to be passed through the garment or garments and sprung into engagement with the head, after the manner of an ordinary safety pin, after which the locking device is swung to engage the hook with the garment fastening member between the garment and head with which the point is in engagement, whereby said garment fastening member is held against displacement by lug 17 in cooperation with the hook and pressure of the fastened portion of the garment against the rear edge of the locking device maintains the latter in position against the head of the safety pin. In other words, the safety pin is fastened to the clothing in the same manner as an ordinary safety pin and the locking device manipulated to hold the garment fastening member in firm engagement with the head or guard to thereby increase the effectiveness of the safety pin in use.

To provide for only a limited sliding movement of the locking device or keeper on the member to which it is hinged the latter may be, and preferably is, provided with a stop 20 formed by slightly flattening said member, and of course this stop may be located closer to the head to assure the locking device assuming the position shown in Fig. 2 when in locked position.

From the foregoing description it will be apparent that my invention provides a very simple and effective locking device that can be employed in connection with an ordinary safety pin without adding materially to the cost of the same, and in addition to being easily manipulated will effect a reliable measure of protection against the point of the pin becoming disengaged, thereby fulfilling the main purpose for which safety pins are designed.

I claim:

1. In combination with a safety pin having spaced apart members the rear member of which is provided with a guard with which the pointed garment fastening member engages, of a device for locking the point within the guard comprising a sheet metal piece having an eye at one end by which the device is hingedly connected to the rear member of the safety pin, a hook at the other end adapted to engage the garment fastening member, and a projection on the locking device cooperating with the hook to retain the garment fastening member in closed position with respect to the guard.

2. In combination with a safety pin having spaced apart members the rear member of which is provided with a guard with which the pointed garment fastening member engages, of a device for locking the point within the guard comprising a sheet metal piece having an eye at one end by which the device is hingedly connected to the rear member of the safety pin, a hook at the other end adapted to engage the garment fastening member, a projection cooperating with the hook to hold said member with the point in engagement with the guard, and a projection adjoining the hinge-eye to reinforce its engagement with the member of the safety pin to which it is connected.

3. In combination with a safety pin having spaced apart members the rear member of which is provided with a guard open at its inner end to receive the point of the garment fastening member, of a device for locking the point within the guard comprising a sheet metal piece having an eye at one end by which it is hingedly connected to the rear member of the safety pin, a hook at the other end adapted to engage the garment fastening member, a projection cooperating with the hook to retain the garment fastening member in engagement with the guard, a projection or lug adjoining the eye to reinforce its connection with the other member of the safety pin, and an inwardly projecting portion at the center of the locking device having an inturned end closing the inner end of the guard.

4. A locking device for safety pins in accordance with claim 1, and including a longitudinal rib at the inner edge thereof to stiffen the device and protect the clothing bearing against the same when the safety pin is in use.

5. A locking device adapted to be used in connection with an ordinary safety pin, said device being made up of a piece of sheet metal shaped to form a rectangular body portion with a hook and an eye at opposite ends thereof, outwardly projecting portions or lugs adjoining the inner side of said hook and eye respectively to reinforce their connection with the spaced apart members of the safety pin, a central projection at one side of the body portion, and a longitudinal rib at the other side or edge thereof, the lugs cooperating with the hook and eye in respect to the parts of the safety pin with which they engage and the rib stiffening the sheet metal device as well as protecting the clothing which engages therewith when the safety pin is in use.

CHARLES A. DIES.